United States Patent [19]

Seibicke et al.

[11] 4,218,018
[45] Aug. 19, 1980

[54] ARRANGEMENT FOR WASHING LENSES OF HEADLIGHTS

[75] Inventors: Horst Seibicke, Bühl-Altschweiert; Eckhard Ursel, Bühl, both of Fed. Rep. of Germany

[73] Assignee: Robert Bosch GmbH, Stuttgart, Fed. Rep. of Germany

[21] Appl. No.: 924,235

[22] Filed: Jul. 13, 1978

[30] Foreign Application Priority Data

Aug. 6, 1977 [DE] Fed. Rep. of Germany ....... 2735508

[51] Int. Cl.$^3$ .............................................. B60S 1/46
[52] U.S. Cl. ............................ 239/284 A; 15/250 A; 416/183
[58] Field of Search ...................... 239/284 R, 284 A; 415/143; 416/182, 183, 175 R; 15/250 A, 250.01

[56] References Cited

U.S. PATENT DOCUMENTS 3,056,911 10/1962 Hart .................................. 239/284 X
3,305,166 2/1967 Castle .................................... 415/143

Primary Examiner—Richard A. Schacher
Attorney, Agent, or Firm—Michael J. Striker

[57] ABSTRACT

An arrangement for washing lenses of headlights comprises a source of washing liquid, conveying conduit communicating with the source and arranged for flowing the washing liquid therethrough, a nozzle communicating with the conveying conduit and arranged for admitting the washing liquid from the latter and issuing the same toward the lens to be washed, and a rotary pump communicating with the conveying conduit and operative for inducing the washing liquid to flow from the source of the nozzle through the conveying conduit. The pump has a chamber into which a supply pipe of the conveying conduit is opened, and a rotor which has a projecting portion extending into the supply pipe. The rotor has a plurality of blades which are circumferentially spaced from one another so that a plurality of gaps are formed each between two adjacent blades, and a plurality of ribs which are arranged on the projecting portion of the rotor. Each of the ribs extends into a respective one of the gaps between two adjacent blades and is circumferentially spaced from the latter.

10 Claims, 3 Drawing Figures

ARRANGEMENT FOR WASHING LENSES OF HEADLIGHTS

BACKGROUND OF THE INVENTION

The present invention relates to an arrangement for washing lenses of headlights.

Arrangements for washing lenses of headlights have been known wherein a rotary pump is provided which induces a washing liquid to flow from a container with the washing liquid to nozzles through supply conduits. The washing liquid then issues from the nozzles toward the lenses to be washed. A rotor of the pump has a projecting portion provided with radial ribs, which extends into a supply pipe open into a chamber of the pump and improves the suction process. The rotor blades extend in a radial direction and are spaced from one another in a circumferential direction. The ribs of the projecting portion of the rotor extends over the entire length of the projecting portion toward the blades of the rotor. However, the ribs of the projecting portion do not reach the rotor blades or, in other words, they are axially spaced from the latter. In such a construction, only rotor blades act upon the washing liquid.

SUMMARY OF THE INVENTION

Accordingly, it is an object of the present invention to provide an arrangement for washing lenses of headlights which avoids the disadvantages of the prior art.

More particularly, it is an object of the present invention to provide an arrangement for washing lenses of headlights, which, in addition to blades arranged on a rotor of a pump, has additional means for acting upon a washing fluid to be issued toward the lenses to be washed.

Another object of the present invention is to provide an arrangement for washing lenses of headlights wherein the washing liquid in inner regions of the rotor of the pump accelerates stronger and thereby the pump pressure increases so that the efficiency of the pump is improved.

In keeping with these objects and with others which will become apparent hereinafter, one feature of the present invention resides, briefly stated, in an arrangement for washing lenses of headlights including a source of washing liquid, conveying means communicating with the source and arranged for flowing the washing fluid therethrough, a nozzle communicating with the conveying means and arranged for admitting the washing liquid from the latter and issuing the same toward the lens to be washed, and a rotary pump communicating with the conveying means and operative for inducing the washing liquid to flow from the source to the nozzle through the conveying means which pump has a chamber in which a supply conduit of the conveying means is open and a rotor having a projecting portion which extends into the supply conduit, wherein each of the ribs arranged on the projecting portion extends into a respective one of gaps formed between two adjacent blades and is circumferentially spaced from the latter.

In such a construction the ribs of the projecting portion of the rotor which extends into the gaps between the blades and are circumferentially spaced from the latter form additional blades of the rotor. Thereby, the washing liquid in inner regions of the rotor accelerates stronger and the pump pressure is increased. As a result of this, the efficiency of the pump is improved.

The blades of the rotor extend in a radial direction thereof. The projecting portion of the rotor is located centrally and extends in an axial direction thereof, whereas the ribs of the projecting portion of the rotor extend in the radial direction. The ribs extend over the entire length of the projecting portion of the rotor. In accordance with another feature of the present invention, the rotor has a predetermined number of blades, and the projecting portion has a number of ribs which corresponds to the predetermined number of the blades.

Still another feature of the present invention is that the ribs of the projecting portion are connected with the rotor blades at a side of the rotor which faces away from the projecting portion thereof. More particularly the rotor blades are connected with extensions of the ribs of the projecting portion. The ribs are connected with the blades by a connecting member which serves to reinforce the rotor.

In accordance with a further feature of the present invention, the connecting member which connects the ribs with the blades is preferably formed as a reinforcing segment.

Finally, a still further feature of the present invention is that the projecting portions, the ribs of the projecting portions, the blades of the rotor, and the segment which connects the ribs with the blades together form an integral member. Preferably, this integral member is constituted by a synthetic plastic material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
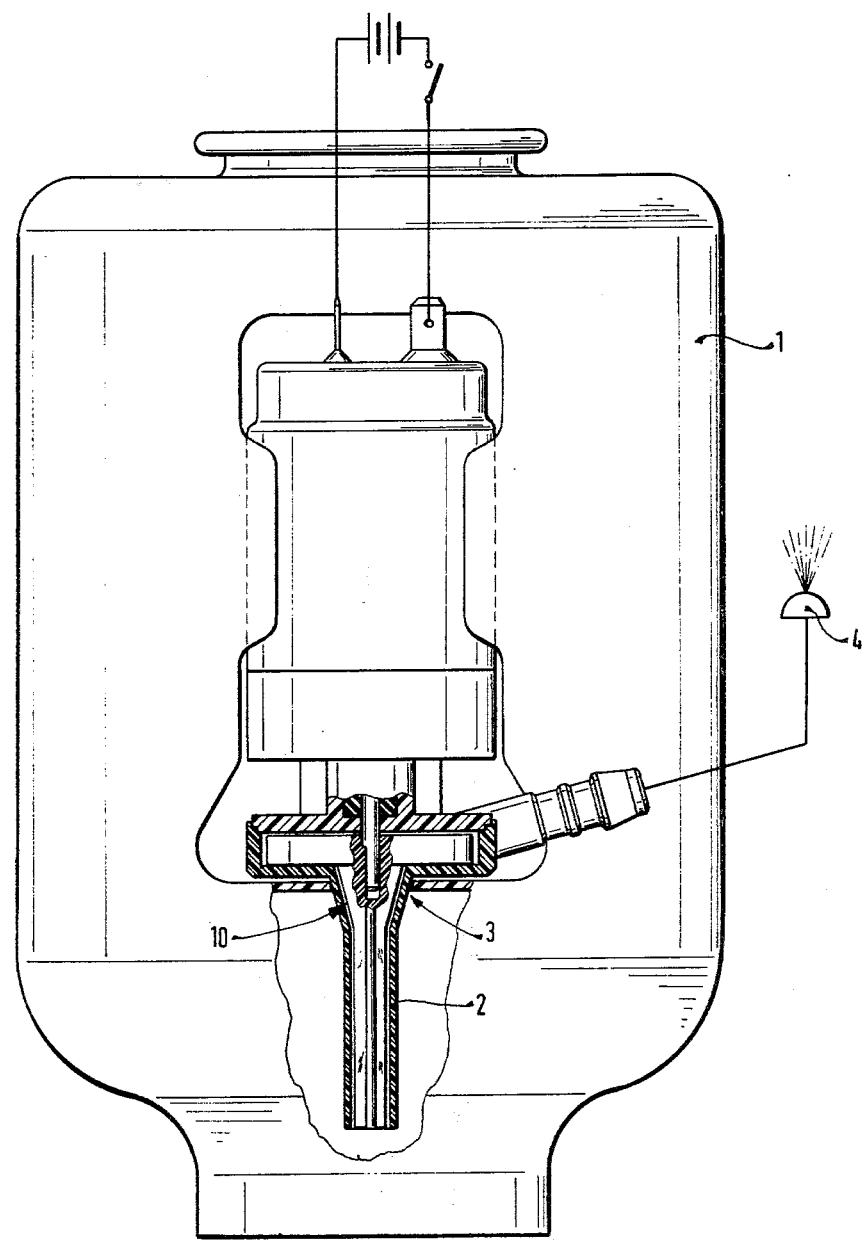
FIG. 1 is a view which schematically shows an arrangement for washing lenses of headlights in accordance with the present invention.

An arrangement for washing lenses of headlight in accordance with the present invention is shown in FIG. 1. It has a container with a washing fluid 1, conveying means including a supply conduit 2 which is open into a chamber of a rotary pump 3 and a nozzle 4. The washing fluid is induced by the pump 3 to flow from the container 1 to the nozzle 4 through the conveying means and to issue from the nozzle 4 toward the lens to be washed.

Figure 2:
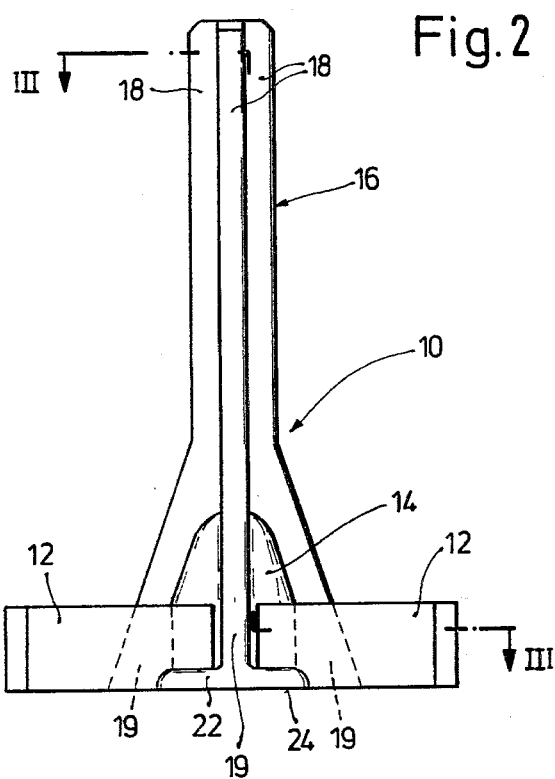
FIG. 2 is a view showing a rotor of a pump of the arrangement shown in FIG. 1.

The pump has a rotor which is identified by reference numeral 10 and is provided with four blades 12 which extend radially from a core part 14 of the rotor. As can be seen from FIG. 2 a projection 16 extends from the core part 14 axially relative to an orbit of rotation of the blades 12. The projection 16 is provided with four ribs 18 which extends in a substantially radial direction.

Figure 3:
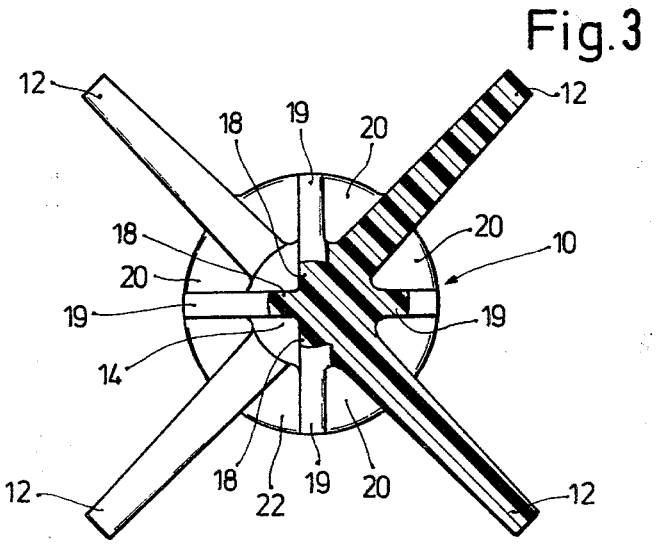
FIG. 3 is an axial view of the rotor shown in FIG. 2 which is partially sectioned along the line III—III of FIG. 2.

As can be seen from FIG. 3, the blades 12 of the rotor 10 are circumferentially spaced from one another so as to form a plurality of intermediate gaps or spaces 20. The arrangement of the ribs 18 of the projections 16 is so selected with respect to the arrangement of the blades 12, that each rib 18 extends into a respective one of the gaps 20 between two adjacent blades 12 of the rotor 10. At the same time, each of the ribs 18 of the projections 16 is circumferentially spaced from the adjacent blades 12 of the rotor. As can be seen from the drawing, the ribs 18 extend over the entire length of the projecting portion 16 of the rotor 10.

The ribs 18 have projections 19, and more particularly the above-mentioned projections 19 extend into the gaps 20 between the blades 12 of the rotor 10. As shown in the drawing, a number of the ribs 18 of the projections 16 corresponds to a number of the blades 12 of the rotor.

Connecting means is provided for connecting the blades of the rotor 10 with the ribs 18 of the projection 16 or more particularly with the extension 19 of the ribs 18. This connecting means is formed as a disc 22 which is composed of several segments and serves as a reinforcing member for reinforcing the rotor 10. The disc 22 is provided at a side 24 of the rotor 10 which faces away from the projection 16. The ribs 18 of the projecting portion 16, the extensions 19 of the ribs 18, the blades 12, the core part 14, and the disc 22 together form an integral member. Such an integral member may be constituted by a synthetic plastic material.

The above described rotor 10, has in addition to four blades 12, auxiliary blade means which is formed by extensions 19 of the ribs 18 of the projection 16. In such a construction, the washing liquid in the inner region of the rotor 10 is stronger accelerated under the action of the additional surfaces of the extensions 19 of the ribs 18 so that the pump pressure is increased and the efficiency of the pump is improved.

It will be understood that each of the elements described above, or two or more together, may also find a useful application in other types of constructions differing from the types described above.

While the invention has been illustrated and described as embodied in an arrangement for washing lenses of headlights it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for washing lenses of headlights comprising a source of washing liquid; conveying means communicating with said source and arranged for flowing said washing liquid therethrough, said conveying means including a supply conduit; a nozzle communicating with said conveying means and arranged for admitting said washing liquid from the latter and issuing the same toward the lens to be washed; and a rotary pump communicating with said conveying means and operative for inducing said washing liquid to flow from said source to said nozzle through said conveying means, said pump having a chamber into which said supply conduit is open and a rotor having a projecting portion which extends into said supply conduit, said rotor having a plurality of blades which are circumferentially spaced from one another so that a plurality of gaps are formed each between two adjacent blades, and a plurality of ribs which are arranged on said projecting portion of said rotor, each of said ribs extending into a respective one of said gaps between two adjacent blades and being circumferentially spaced from the latter.

2. The arrangement as defined in claim 1, wherein said rotor has an axis and said blades extend in a radial direction.

3. The arrangement as defined in claim 2, wherein said projecting portion of said rotor is located centrally and extends in an axial direction, whereas said ribs of said projecting portion extend in a radial direction.

4. The arrangement as defined in claim 1, wherein said ribs extend over the entire length of said projecting portion of said rotor.

5. The arrangement as defined in claim 1, wherein said rotor has a predetermined number of said blades, said projecting portion having a number of said ribs which corresponds to said predetermined number of said blades.

6. The arrangement as defined in claim 1, wherein said rotor has a side which faces away from said projecting portion thereof, said blades and said ribs being connected with one another at said side of said rotor so as to reinforce the latter; and further comprising means for connecting said blades with said ribs.

7. The arrangement as defined in claim 6, wherein said connecting means is formed as a reinforcing segment.

8. The arrangement as defined in claim 7, wherein each of said ribs of said projecting portion has an extension which extends between two adjacent blades of said rotor, said reinforcing segment connecting said blades with said extensions of said ribs.

9. The arrangement as defined in claim 7, wherein said projecting portion, said ribs, said blades and said segment of said rotor together form an integral member.

10. The arrangement as defined in claim 9, wherein said integral member is constituted by a synthetic plastic material.

* * * * *